US012532244B2

(12) United States Patent
Ru

(10) Patent No.: US 12,532,244 B2
(45) Date of Patent: Jan. 20, 2026

(54) WIRELESS COMMUNICATION METHOD AND CONFIGURATION DEVICE

(71) Applicant: GUANGDONG OPPO MOBILE TELECOMMUNICATIONS CORP., LTD., Guangdong (CN)

(72) Inventor: Zhao Ru, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 359 days.

(21) Appl. No.: 18/492,653

(22) Filed: Oct. 23, 2023

(65) Prior Publication Data

US 2024/0056946 A1 Feb. 15, 2024

Related U.S. Application Data

(63) Continuation of application No. PCT/CN2021/090339, filed on Apr. 27, 2021.

(51) Int. Cl.
*H04W 48/02* (2009.01)
*H04W 12/069* (2021.01)
*H04W 12/084* (2021.01)

(52) U.S. Cl.
CPC ......... *H04W 48/02* (2013.01); *H04W 12/069* (2021.01); *H04W 12/084* (2021.01)

(58) Field of Classification Search
CPC . H04W 48/02; H04W 12/069; H04W 12/084; H04W 12/08; H04L 12/28
See application file for complete search history.

(56) References Cited

U.S. PATENT DOCUMENTS

| 11,405,783 | B2* | 8/2022 | Chen .................. H04W 12/71 |
| 2016/0134622 | A1* | 5/2016 | Singh .................. H04W 12/084 726/6 |
| 2016/0366183 | A1 | 12/2016 | Smith et al. |
| 2017/0257372 | A1 | 9/2017 | Meriac |
| 2021/0211879 | A1* | 7/2021 | Zisimopoulos ....... H04W 60/00 |

FOREIGN PATENT DOCUMENTS

| CN | 106815234 A | 6/2017 |
| CN | 107153359 A | 9/2017 |
| CN | 108183843 A | 6/2018 |
| CN | 111162975 A | 5/2020 |

(Continued)

OTHER PUBLICATIONS

Uddin, Mumina, Shareeful Islam, and Ameer Al-Nemrat. "A dynamic access control model using authorising workflow and task-role-based access control." Ieee Access 7 (2019): 166676-166689. (Year: 2019).*

(Continued)

*Primary Examiner* — Sharad Rampuria
(74) *Attorney, Agent, or Firm* — Ladas & Parry, LLP

(57) ABSTRACT

A wireless communication method and a configuration device are provided. The wireless communication method includes: a first configuration device sends configuration information to a smart terminal, wherein the configuration information includes at least a target ACL, and the target ACL is configured to indicate an access privilege that a second configuration device has for the smart terminal.

20 Claims, 8 Drawing Sheets

(56) References Cited

FOREIGN PATENT DOCUMENTS

| | | |
|---|---|---|
| CN | 112583867 A | 3/2021 |
| WO | 2022226807 A1 | 11/2022 |

OTHER PUBLICATIONS

Zigbee alliance; "Project Connected Home over IP"; Joint Administrative Service (JAS) Design; Nov. 5, 2020.
"Connected Home over IP Specification"; Version 0.7-core-ballot; Apr. 9, 2021.
International Search Report in the International Application No. PCT/CN2021/090339, mailed Jan. 26, 2022.
Written Opinion of the International Searching Authority in International Application No. PCT/CN2021/090339, mailed Jan. 26, 2022, with English translation provided by foreign counsel and by WIPO.

\* cited by examiner

WIRELESS COMMUNICATION METHOD AND CONFIGURATION DEVICE

CROSS REFERENCE TO RELATED APPLICATIONS

The present disclosure is a continuation of International Patent Application No. PCT/CN2021/090339 filed Apr. 27, 2021, the contents of which is herein incorporated by reference in its entirety.

TECHNICAL FIELD

The present disclosure relates to the technical field of Internet of Things, in particular to a wireless communication method and a configuration device.

BACKGROUND

In a scenario for privilege sharing in cross-Fabrics, a configuration device with an administrator privilege in Fabric A shares the Onboarding Token (OT) to a configuration device in Fabric B through an out-of-band mechanism, and then the configuration device in Fabric B can establishes a connection with a smart terminal (e.g., smart bulb) through the OT to possess administrator identity for the smart terminal. Thus, the configuration device in Fabric B can fully control and configure the smart terminal. In this case, the configuration device in Fabric A cannot control administrator privilege that the configuration device in Fabric B has.

SUMMARY OF THE DISCLOSURE

In a first aspect, some embodiments in the present disclosure provide a wireless communication method, including: sending, by a first configuration device, configuration information to a smart terminal, wherein the configuration information includes at least a target access control list (ACL); and the target ACL is configured to indicate an access privilege that a second configuration device has for the smart terminal.

In a second aspect, some embodiments in the present disclosure provide a wireless communication method, including: receiving, by a smart terminal, configuration information sent from a first configuration device, wherein the configuration information includes at least a target access control list (ACL); the target ACL is configured to indicate an access privilege that a second configuration device has for the smart terminal; determining, by the smart terminal, the access privilege that a second configuration device has for the smart terminal based on the target ACL.

In a third aspect, some embodiments in the present disclosure provide a configuration device, including: a processor and a memory, wherein the memory is configured to store a computer program; the processor is configured to invoke and perform the computer program in the memory, and execute the method through the first configuration device mentioned in the first aspect.

DETAILED DESCRIPTION

The technical solutions in the embodiments of the present disclosure will be described below in conjunction with the accompanying drawings in the embodiments of the present disclosure. It is clear that the described embodiments are a part of the embodiments of the present disclosure and not all of them. With respect to the embodiments in the present disclosure, all other embodiments obtained by the skilled in the art without making creative labor fall within the scope of protection of the present disclosure.

In the field of Internet of Things, different Fabrics may be established by different vendors. A configuration device may access and control one or more smart terminals within a same Fabric. For example, a cell phone accesses and controls a smart bulb to be turned on or off. A configuration device with administrator privileges in a Fabric may share the administrator privileges to configuration devices in other Fabric, so that configuration devices in other Fabrics may also have the administrator privileges for one or more smart terminals. For example, a configuration device with an administrator privilege in Fabric A shares the Onboarding Token (OT) to a configuration device in Fabric B through an out-of-band mechanism, and then the configuration device in Fabric B can establishes a connection with a smart terminal (e.g., smart bulb) through the OT to possess administrator identity for the smart terminal. Thus, the configuration device in Fabric B can fully control and configure the smart terminal. In this case, the configuration device in Fabric A cannot control administrator privilege that the configuration device in Fabric B has. For example, it is not expected for Fabric A that certain configurations are modified by Fabric B, but as the administrator privilege of the smart terminal has been shared to Fabric B, the configuration device in Fabric B may configure the smart terminal arbitrarily.

Figure 1:
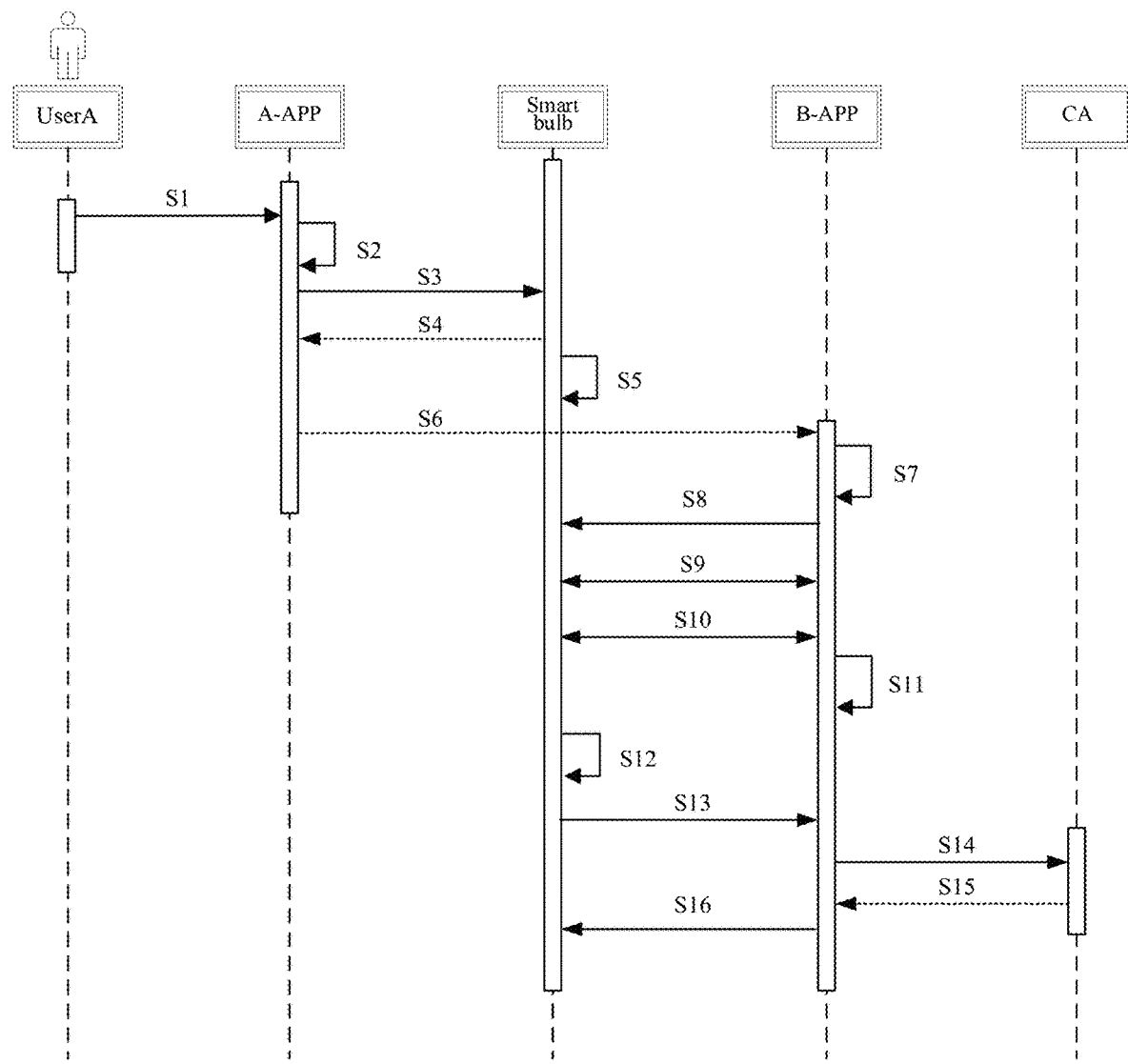
FIG. 1 is a flow chart of privilege sharing provided in the present disclosure.

For example, as shown in FIG. 1, user A purchases a smart bulb, which is a product certified by Connected Home over IP Working Group (CHIP) under the Alliance and supports Bluetooth Low Energy (BLE) and/or Wireless Fidelity (WiFi). User A uses application A (i.e. A-APP) on a cell phone to configure the smart bulb in the living room, and later user A may control the smart bulb with A-APP. In this case, A-APP is an administrator, a commissioner, and a controller. User A adds B-APP as the second administrator, and controller of the smart bulb on another cell phone of User B. Specifically, A-APP may add B-APP as the administrator of the smart bulb through S1-S16.

S1. User A triggers to initiate the configuration mode of the smart bulb.

S2. A-APP generates an Onboarding Token (OT), wherein the OT may include a randomly-generated SetupCode and a discriminator. The OT specifically may be shown in Table 1 below.

S3. A-APP sends a command for initiating configuration to the smart bulb, wherein the command carries the OT.

S4. The smart bulb receives the command and sends a confirmation response to A-APP.

S5. The smart bulb enters into a configuration discovery mode, for example, to publish Domain Name System Service Discovery (DNS-SD).

S6. A-APP shares the OT to B-APP in out-of-band manners such as an email and a voice.

S7. B-APP queries the DNS-SD.

S8. B-APP discovers the smart bulb and connects to the resolved Internet Protocol (IP) address/port.

S9. A secure connection is established between the smart bulb and the B-APP through the OT.

S10. B-APP authenticates the Certification Declaration (CD) of the smart bulb.

S11. B-APP creates a Fabric ID for the home network if the Fabric B has not been used in the home network.

S12. The smart bulb obtains an operation key.

S13. The smart bulb sends a device certificate request to the B-APP, such as Certificate Signing Request of bulb (i.e. CSR. bulb).

S14. B-APP sends the CSR. bulb and the Fabric ID to the Certification Privilege (CA) of Fabric B to request a device certificate.

S15. the CA of Fabric B generates a bulb operation certificate (i.e. B.OC.bulb) back to the B-APP after authentication.

S16. B-APP configures the B.OC.bulb and an access control privilege (i.e. ACL.Bulb.B.APP) to the smart bulb.

TABLE 1

| No. | Name | Type | Description |
| --- | --- | --- | --- |
| 1 | Version | Octet string | OT version |
| 2 | VID | unint16 | Vendor ID allocated by Zigbee Alliance |
| 3 | PID | unint16 | Product ID |
| 4 | Discriminator | unint16 | Vendor ID |
| 5 | SetupCode | Octet string | Paired PIN code |
| 6 | DNS-SD | Octet string | Device discovery data |
| 7 | Special Instructions | Octet string | Vendor customized messages |

It should be noted that in FIG. 1 mentioned above, A-APP is a configuration device with administrator privileges in Fabric A, and B-APP is a configuration device in Fabric B.

In the process shown in FIG. 1 mentioned above, a configuration device with an administrator privilege in Fabric A shares the Onboarding Token (OT) to a configuration device in Fabric B through an out-of-band mechanism, and then the configuration device in Fabric B can establishes a connection with a smart terminal (e.g., smart bulb) through the OT to possess administrator identity for the smart terminal. Thus, the configuration device in Fabric B can fully control and configure the smart terminal. In this case, the configuration device in Fabric A cannot control administrator privilege that the configuration device in Fabric B has. For example, it is not expected for Fabric A that certain configurations are modified by Fabric B, but as the administrator privilege of the smart terminal has been shared to Fabric B, the configuration device in Fabric B may configure the smart terminal arbitrarily.

It should be noted that Fabric may also be understood as a platform, an ecology, a security domain, or similar descriptions. It is not limited in the present disclosure.

Based on the above problems, the present disclosure provides a solution for controlling to share management privileges, in which the privilege-sharing party may restrict the configuration privileges that the privilege-shared party has for a smart terminal. Thus, this optimizes cross-Fabric privilege sharing in the field of Internet of Things.

To facilitate a better understanding of the embodiments of the present disclosure, ACL related to the present disclosure is described.

ACL is a packet filtering-based access control technique that filters packets on an interface and allows them to pass or discard them based on set conditions.

An ACL includes several Access Control List Entries (ACLE). A structure of each ACLE is shown in Table 2 below.

TABLE 2

| Id | Name | Type | Description |
| --- | --- | --- | --- |
| 0 | Privilege | Enum | The privilege level granted for this entry |
| 1 | AuthMode | AuthMode | Authentication type, describing the type of secure channel authentication method applied by the subject of the entry |
| 2 | Subjects | List [SubjectId] | List of source subjects to which the entry is applied |
| 3 | Targets | List [TargetStruct] | A list of the target clusters which applies the entry applies. |
| 4 | Extension | Octet string | An optional extension load used for cryptographic signatures, vendor-specific ACL content, or other metadata |

In particular, in Table 2 mentioned above, "subject" primarily means to be a source of the operation described in a given authentication method provided by the secure channel architecture. The subject shall be the following.

1. A kind of initiator node that interacts through a Password Authenticated Session Establishment (PASE) session during a commissioning phase, implicitly identified by the fact that the two peers in the PASE session authenticate each other locally.

2. An initiator node that interacts through a Certificate Authenticated Session Establishment (CASE) session during the operational phase, identified by a distinguishable name (e.g., a node ID) from an operational certificate (OpCert) shared during the session establishment.

3. A group, which is an initiator node for interaction through a message group, identified by a group ID and verified by an operational group key.

The technical solutions in the embodiments of the present disclosure may be applied to various communication systems, such as WiFi, BLE, Wireless Local Area Networks (WLAN), mobile communication networks, Near Field Communication (NFC) networks, Ultra Broadband (UWB)

networks, infrared networks, microwave communication networks, millimeter wave communication networks, and free space optical communication networks. Embodiments of the present disclosure may also be applied to Device to Device (D2D) communication, Machine to Machine (M2M) communication, Machine Type Communication (MTC), Vehicle to Vehicle (V2V) communication, or Vehicle to everything (V2X) communication, etc.

Figure 2:
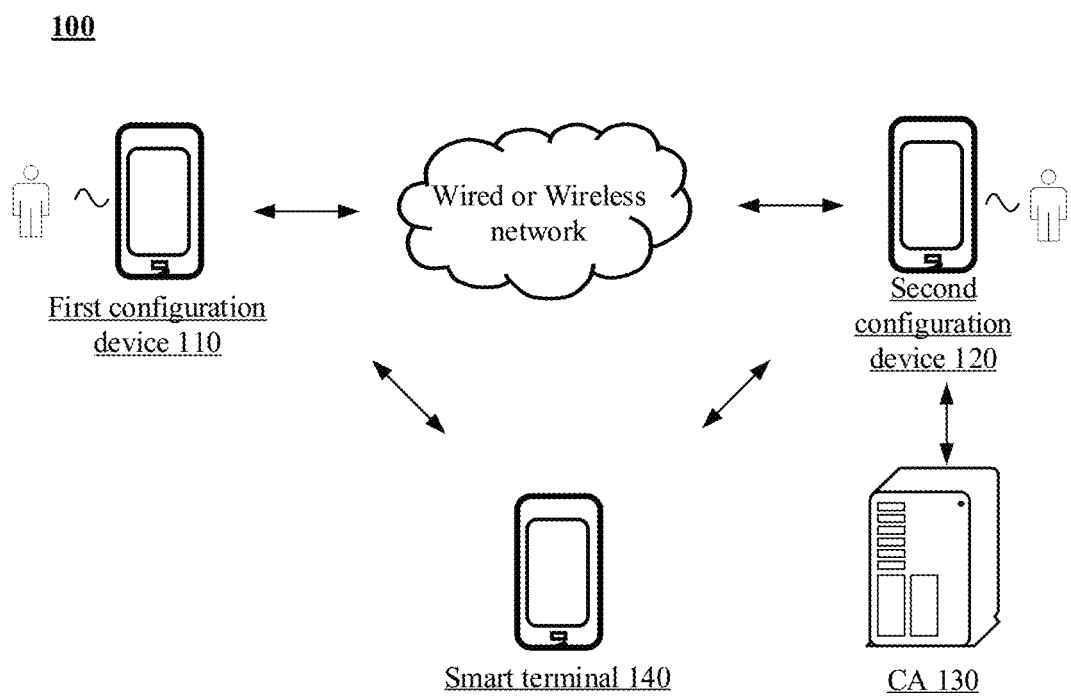
FIG. 2 is a schematic view of a communication system applied in some embodiments of the present disclosure.

FIG. 2 is a schematic view of a communication system applied in some embodiments of the present disclosure. As shown in FIG. 2, the wireless communication system 100 may include a first configuration device 110, a second configuration device 120, a CA 130, and a smart terminal 140.

In some embodiments, the first configuration device 110 and/or the second configuration device 120 may be a terminal device, such as a cellular phone, a tablet computer, a computer, a Wireless Local Loop (WLL) station, a Personal Digital Assistant (PDA) device, a handheld device with a wireless communication function, computing devices or other processing devices connected to a wireless modem, in-vehicle devices, smart wearable devices, etc.

In some embodiments, the first configuration device 110 and/or the second configuration device 120 may also be server(s).

In some embodiments, the first configuration device 110 and the second configuration device 120 may belong to different Fabric.

In some embodiments, the first configuration device 110 and the smart terminal 140 belong to the same Fabric, and the first configuration device 110 has access privileges (e.g., administrator privileges) for the smart terminal 140, through which the first configuration device 110 may access and control the smart terminal 140.

In some embodiments, the first configuration device 110 and the second configuration device 120 may be connected by wired or wireless means, and the first configuration device 110 may share the access privileges for the smart terminal 140 to the second configuration device 120.

In some embodiments, the smart terminal 140 is at least connected to the first configuration device 110 by wired or wireless means. The smart terminal 140 may be any of the above-described terminal devices, and moreover, the smart terminal 140 may be a smart home product such as a smart refrigerator, a smart bulb, a smart washing machine, a smart TV, a smart wearable device, etc.

In some embodiments, the wearable device may also be referred to as a wearable smart terminal, which is a general term for applying wearable technology to smartly design and develop wearable devices for daily wear, such as eyeglasses, gloves, watches, apparel, and shoes. A wearable device is a portable device that is worn directly on the body or integrated into the user's clothing or accessories. The wearable device is not only a hardware device, but also realizes powerful functions through software support as well as data interaction and cloud interaction. Broadly speaking, wearable smart terminals include full-featured, large-sized smart terminals that may not rely on a smartphone to realize complete or partial functions, such as smart watches or smart glasses, etc., and also include terminals that only focus on a certain type of application function and need to be used in conjunction with other devices, for example, smartphones, such as various types of smart bracelets and smart jewelry that perform physical signs monitoring.

In some embodiments, the smart terminal 140 may also be connected to a second configuration device 120 by wired or wireless means, which has access privileges for the smart terminal 140, and the second configuration device 120 may access and control the smart terminal 140 through the access privileges.

In some embodiments, the CA 130 may be a device with certificate authorization privileges. The CA 130 is connected to the second configuration device 120 by wired or wireless means, and the CA 130 may generate a corresponding application certificate for the second configuration device 120 or update the application certificate through interaction.

In some embodiments, the number of smart terminals 140 may be one or more. It is not limited in the present disclosure.

It should be understood that the terms "system" and "network" are often used interchangeably in the present disclosure. The term "and/or", as used herein, is merely a description of an association relationship of an associated object, indicating that three relationships may exist. For example, A and/or B, which may be expressed as: A alone, both A and B, and B alone. In addition, the character "/" herein generally indicates that the associated objects are in an "or" relationship.

The terms used in the embodiments of the present disclosure are used only to explain specific embodiments of the present disclosure and are not intended to limit the present disclosure. The terms "first", "second", "third", and "fourth", etc. in the specification, the claims, and the described drawings of the present disclosure are used to distinguish between different objects and are not used to describe a particular order. In addition, the terms "including", "having", and any variations thereof, are intended to cover non-exclusive inclusion.

It is to be understood that in embodiments of the present disclosure the reference to "indicating" may be a direct indication, an indirect indication, or an indication of an associative relationship. For example, an indication of B by A can mean that A directly indicates B. For example, B can be accessed by A. Alternatively, A indirectly indicates B, e.g., that A indicates C, and that B can be accessed by C. Alternatively, there is an associative relationship between A and B.

In the description of the embodiments of the present disclosure, the term "corresponding" may indicate a direct or indirect corresponding relationship between the two, or an associated relationship between the two, or a relationship of indicating and being indicated, configuring and being configured, etc.

In some embodiments of the present disclosure, "predefined" can be realized by pre-storing a corresponding code, table, or other means that can be used to indicate relevant information in a device (for example, including a terminal device and a network device), and the present disclosure does not limit the specific realization thereof. For example, predefinition may mean to be defined in a protocol.

In some embodiments of the present disclosure, the "protocol" may refer to a standard protocol in the field of Internet of Things.

The technical solution of the present disclosure is described in detail below by means of specific embodiments.

Figure 3:
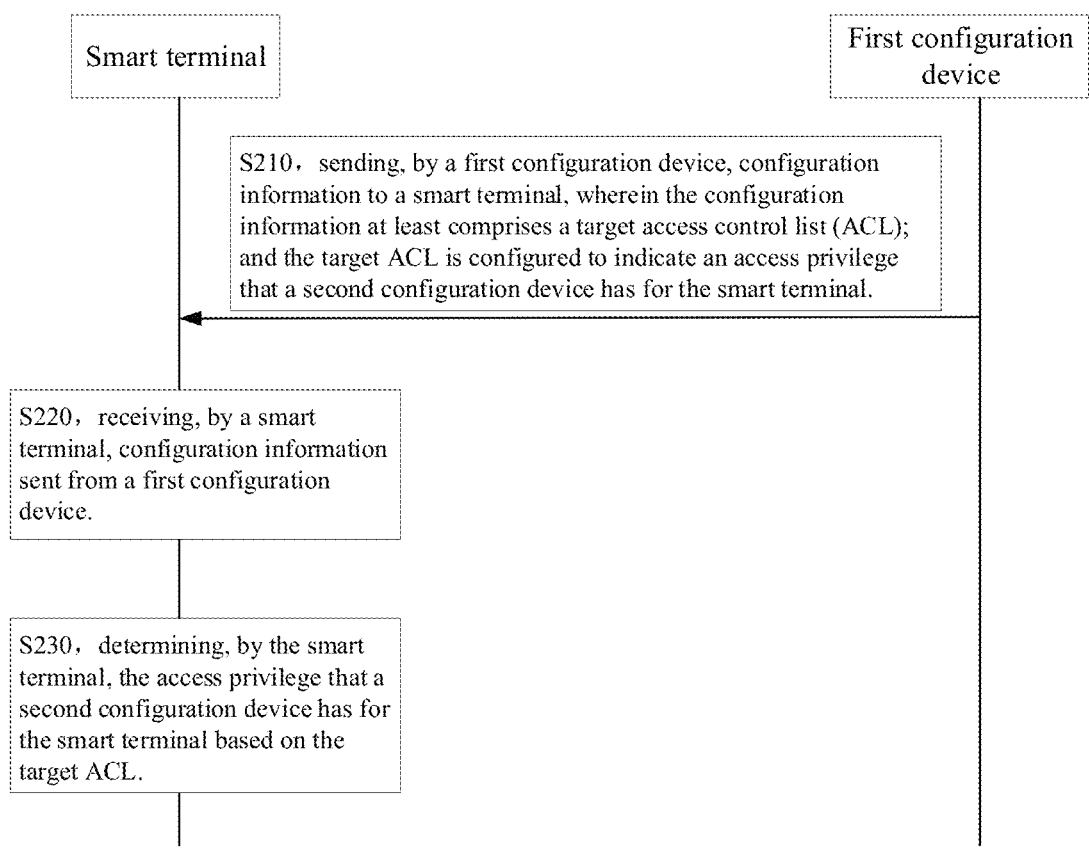
FIG. 3 is a schematic interactive flow chart of a wireless communication method according to some embodiments of the present disclosure.

FIG. 3 is a schematic interactive flow chart of a wireless communication method 200 according to some embodiments of the present disclosure. As shown in FIG. 3, the wireless communication method 200 may include at least the following.

At S210, sending, by a first configuration device, configuration information to a smart terminal, wherein the configuration information at least includes a target access control list (ACL); the target ACL is configured to indicate access privileges that a second configuration device has for the smart terminal.

At S220, receiving, by the smart terminal, the configuration information sent from the first configuration device.

At S230, determining, by the smart terminal, the access privileges that the second configuration device has for the smart terminal, based on the target ACL.

The first configuration device may be, for example, a configuration device in the Fabric A that has administrator privileges for the smart terminal (e.g., A-APP in the Fabric A), and the second configuration device is a configuration device in the Fabric B (e.g., B-APP in the Fabric B).

The first configuration device may add the second configuration device as an administrator of the smart terminal, and at the same time, the first configuration device restricts the access privileges that the second configuration device has for the smart terminal as indicating a target ACL to the smart terminal.

In some embodiments, the configuration information may be a command for initiating configuration sent from the first configuration device to the smart terminal. The configuration information may also include, for example, a timeout period, a SetupCode or a SetupCode verifier, etc.

In some embodiments, assuming that the smart terminal is a smart bulb, the target ACL may be, for example, ACL-.Bulb.PASE.

In some embodiments, the smart terminal may determine privileges that the second configuration device has for configuration operations based on the target ACL. For example, the smart terminal refuses configuration operations in response to the target ACL indicating that the second configuration device has no privileges of the configuration operations; and/or, the smart terminal performs the configuration operations in response to the target ACL indicating that the second configuration device has the privileges of the configuration operations.

In some implementations, the configuration operations may be any configuration operation initiated by that second configuration device, or, the configuration operations may be some specific configuration operations initiated by that second configuration device.

In some embodiments, the first configuration device may generate the target ACL based on information for establishing a connection by the second configuration device.

For example, the information for establishing a connection by the second configuration device may be: information for establishing a connection with the smart terminal by the second configuration device, and/or, information for establishing a connection with the first configuration device by the second configuration device. Of course, the information for establishing a connection by the second configuration device may also be: information for establishing a connection with other devices by the second configuration device, which is not limited in the present disclosure.

In some implementations, the information for establishing a connection by the second configuration device includes one of a SetupCode ID and a discriminator.

For example, the SetupCode ID uniquely identifies a PIN code for establishing a connection with the second configuration device.

For example, the discriminator is a vendor ID for establishing a connection by the second configuration device.

In Example 1, the first configuration device may generate the target ACL based on access privilege information and the SetupCode ID. That is, the target ACL is generated based on the access privilege information and the SetupCode ID.

In Example 1, the SetupCode ID uniquely identifies a PIN code (e.g., a PIN code) for establishing a connection with the second configuration device.

It is noted that for any shared device, the SetupCode ID uniquely identifies a PIN code paired by the shared device. That is, different PINS correspond to different IDs, and the SetupCode ID is not unique for different shared devices.

In Example 1, the access privilege information may, for example, include access privileges for one or more access objects. Assuming that the smart terminal is a smart bulb, whose access objects include temperature, brightness, and color, the access privilege information includes, for example, privilege 1 corresponding to temperature, privilege 2 corresponding to brightness, and privilege 3 corresponding to color.

It should be noted that privilege 1, privilege 2, and privilege 3 may be defaulted, or may be indicated by a user, for example, a user in Fabric A.

In some implementations of Example 1, the SetupCode ID is generated by the first configuration device. For example, the first configuration device generates an onboarding token that includes the SetupCode ID.

For example, the first configuration device generates an onboarding token OT, the OT including a random PIN code and an ID (i.e., a SetupCode ID) assigned to the PIN code, as shown in Table 3.

TABLE 3

| No. | Name | Type | Description |
|---|---|---|---|
| 1 | Version | Octet string | OT version |
| 2 | VID | unint16 | Vendor ID allocated by Zigbee Alliance |
| 3 | PID | unint16 | Product ID |
| 4 | Discriminator | unint16 | PIN code ID |
| 5 | SetupCode ID | unint16 | Paired PIN code |
| 6 | SetupCode | Octet string | Paired PIN code |
| 7 | DNS-SD | Octet string | Device discovery data |
| 8 | Special Instructions | Octet string | Vendor customized messages |

In another implementations of Example 1, the SetupCode ID is generated by the smart terminal. For example, the first configuration device sends pre-configuration information to the smart terminal, the pre-configuration information including a SetupCode or a SetupCode verifier; and the first configuration device receives a pre-configuration response sent from the smart terminal, the pre-configuration response including the SetupCode ID, and the SetupCode ID corresponding to the SetupCode or the SetupCode verifier.

For example, the first configuration device sends a command for initiating configuration to the smart terminal, and the command carries a SetupCode or a SetupCode verifier. The smart terminal, after receiving the command, generates an ID for the SetupCode corresponding to the SetupCode verifier, or alternatively, generates an ID for the SetupCode, i.e., a SetupCode ID. The smart terminal returns the generated SetupCode ID to the first configuration device through a response.

In some implementations of Example 1, the access privilege information is defaulted, or the access privilege information is pre-configured or agreed in a protocol.

In another implementations of Example 1, the access privilege information is user-indicated.

For example, the first configuration device receives a user command that are configured to indicate the access privilege information.

For another example, the first configuration device sends request information to the user, and the request message is configured to request the user to configure an access privilege that the second configuration device has for the smart terminal; and the first configuration device receives a user command, and the user command is configured to indicate the access privilege information.

In some implementations of Example 1, the target ACL includes at least one of: the SetupCode ID, access object information, privilege information corresponding to an access object, and a connection mode based on key authentication. For example, the connection mode based on key authentication is PASE. In Example 1, for example, the target ACL includes:

```
{
    Privilege = Administrator,      // Privilege is administrator
    AuthMode = PASE,                // Connection mode is PIN-based configuration
    Subjects = <SetupCode ID>,      //Subjects are devices connected with a specific SetupCode
    Targets = Cluster[1]            //Target resources to access
}
```

In some implementations of Example 1, the configuration information also includes the SetupCode ID. Specifically, after obtaining the SetupCode ID, the smart terminal may determine the corresponding target ACL based on the SetupCode ID. Thus, the smart terminal may determine access privileges that the second configuration device has for the smart terminal, based on the target ACL.

In some implementations of Example 1, the smart terminal determines the corresponding the SetupCode ID based on the SetupCode applied in a secure connection established with the second configuration device, and determines the corresponding target ACL based on the SetupCode ID.

In some implementations of Example 1, the smart terminal discards or deletes the target ACL and/or the SetupCode ID. Specifically, after completing the configuration, the smart terminal discards or deletes the target ACL and/or the SetupCode ID. That is, the target ACL and/or the SetupCode ID is only used for a single configuration and needs to be reconfigured when being needed subsequently.

In Example 2, the first configuration device generates the target ACL based on access privilege information and the discriminator. That is, the target ACL is generated based on the access privilege information and the discriminator.

In Example 2, the discriminator is a vendor ID for establishing a connection by the second configuration device.

In Example 2, the access privilege information may, for example, include access privileges for one or more access objects. Assuming that the smart terminal is a smart bulb, whose access objects include temperature, brightness, and color, the access privilege information includes, for example, privilege A corresponding to temperature, privilege B corresponding to brightness, and privilege C corresponding to color.

It should be noted that privilege A, privilege B, and privilege C may be defaulted, or may be indicated by a user, for example, a user in Fabric A.

In some implementations of Example 2, the access privilege information is defaulted, or the access privilege information is pre-configured or agreed in a protocol.

In another implementations of Example 2, the access privilege information is user-indicated.

For example, the first configuration device receives a user command that are configured to indicate the access privilege information.

For another example, the first configuration device sends request information to the user, and the request message is configured to request the user to configure an access privilege that the second configuration device has for the smart terminal; and the first configuration device receives a user command, and the user command is configured to indicate the access privilege information.

In some implementations of Example 1, the target ACL includes at least one of: the SetupCode ID, access object information, privilege information corresponding to an access object, and a connection mode based on key authentication. For example, the connection mode based on key authentication is PASE. In Example 2, for example, the target ACL includes:

```
{
    Privilege = Administrator,      // Privilege is administrator
    AuthMode = PASE,                // Connection mode is PIN-based configuration
    Subjects = <SetupCode ID>,      //Subjects are devices connected with a specific SetupCode
    Targets = Cluster[1]            //Target resources to access
}
```

In some implementations of Example 2, the configuration information also includes the Discriminator. Specifically, after obtaining the discriminator, the smart terminal may determine the corresponding target ACL based on the discriminator. Thus, the smart terminal may determine access privileges that the second configuration device has for the smart terminal, based on the target ACL.

In some implementations of Example 2, the smart terminal determines the corresponding target ACL based on the discriminator applied in a secure connection established with the second configuration device.

In some implementations of Example 2, the smart terminal discards or deletes the target ACL and/or the discriminator. Specifically, after completing the configuration, the smart terminal discards or deletes the target ACL and/or the discriminator. That is, the target ACL and/or the discriminator is only used for a single configuration and needs to be reconfigured when being needed subsequently.

The technical solution of the present disclosure is described in detail below in Embodiment 1 to Embodiment 3.

Figure 4:
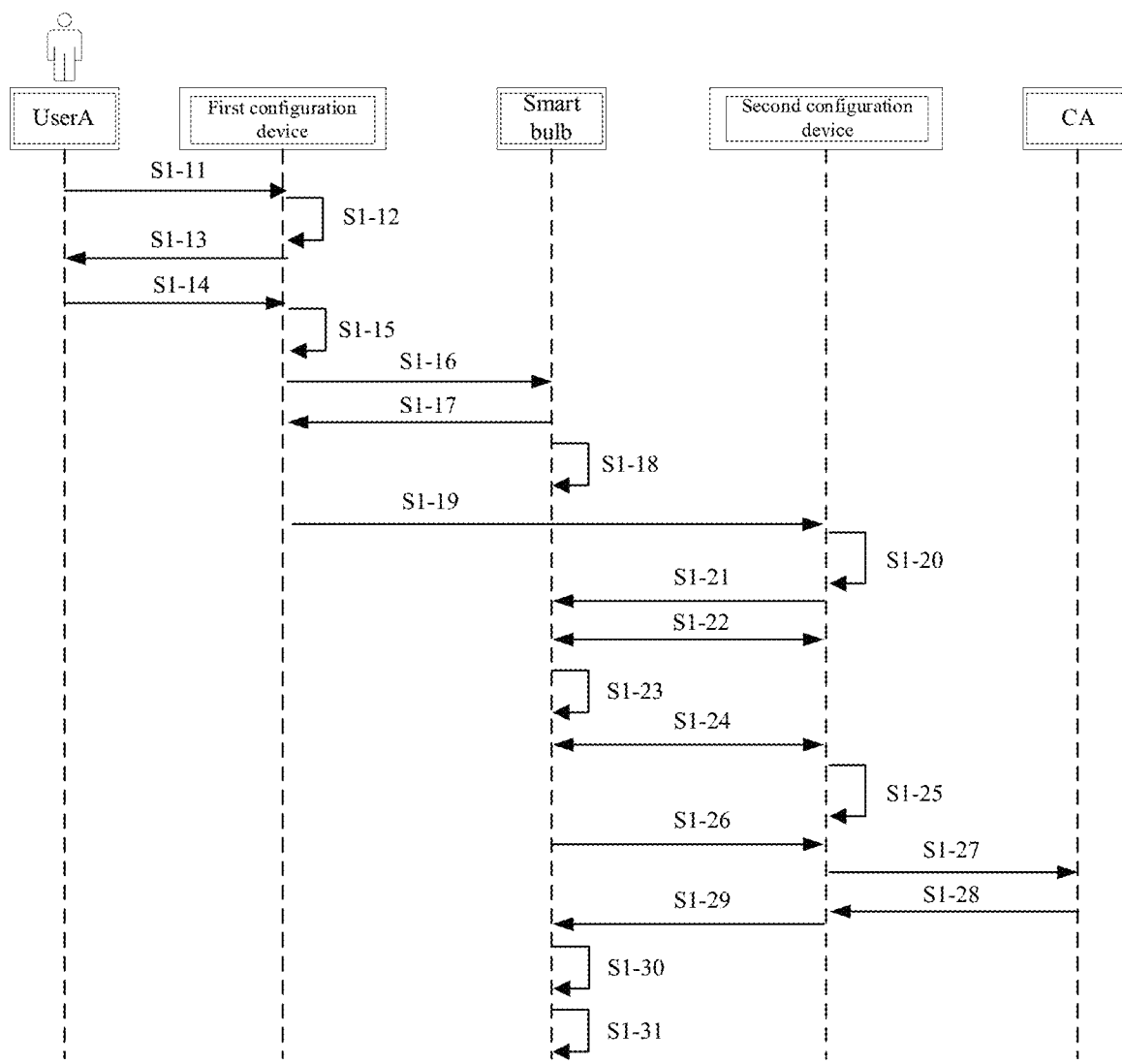
FIG. 4 is a schematic interactive flow chart of privilege sharing according to some embodiments of the present disclosure.

In Embodiment 1, the first configuration device generates the target ACL based on the access privilege information and the SetupCode ID, and the SetupCode ID is generated by the first configuration device. Specifically, the first configuration device is a configuration device in Fabric A (e.g., A-APP in Fabric A) that has administrator privileges for the smart terminal, and the second configuration device is a configuration device in Fabric B (e.g., B-APP in Fabric B), assuming that the smart terminal is a smart bulb. As shown in FIG. 4, the first configuration device may add the second configuration device as an administrator of the smart terminal through at least some of the following operations at S1-11 to S1-31.

At S1-11, User A triggers to initiate the configuration mode of the smart terminal.

At S1-12, the first configuration device generates an onboarding token (OT), the OT including a random PIN code and an ID (i.e., SetupCode ID) assigned to the PIN code.

At S1-13, the first configuration device requests user A to configure user B's administrative privileges.

At S1-14, User A configures the administrative privileges for user B.

At S1-15, the first configuration device generates ACL.Bulb.PASE (i.e., target ACL) based on the privileges configured by User A (i.e., access privilege information) and the SetupCode ID.

For example, the ACL.Bulb.PASE includes:

```
{
    Privilege = Administrator,      // Privilege is administrator
    AuthMode = PASE,                // Connection mode is PIN-based configuration
    Subjects = <SetupCode ID>,      //Subjects are devices connected with a specific SetupCode
    Targets = Cluster[1]            //Target resources to access
}
```

At S1-16, the first configuration device sends a command for initiating configuration (i.e., configuration information) to the smart terminal, which carries a timeout period, the SetupCode/SetupCode verifier, the SetupCode ID, and ACL.Bulb.PASE.

At S1-17, the smart terminal receives the command and returns a response.

At S1-18, the smart terminal enters into a configuration discovery mode.

At S1-19, the first configuration device shares the OT to the second configuration device in out-of-band manners such as an email and a voice.

At S1-20, the second configuration device turns on the discovery mode.

At S1-21, the second configuration device discovers the smart terminal.

At S1-22, the second configuration device and the smart terminal establish a secure connection through the OT.

At S1-23, the smart terminal finds the corresponding SetupCode ID according to the SetupCode for establishing the secure connection, and finds the ACL.Bulb.PASE according to the SetupCode ID, and further, determines the privileges that the second configuration device has according to the ACL.Bulb.PASE.

At S1-24, the second configuration device authenticates the CD of the smart terminal.

At S1-25, the second configuration device creates a Fabric ID for the home network if the Fabric B has not been used in the home network.

At S1-26, the smart terminal sends a device certificate request CSR.bulb to the second configuration device.

At S1-27, the second configuration device sends the CSR.bulb and the Fabric ID to CA of the Fabric B to request a device certificate.

At S1-28, the CA of the Fabric B authenticates and then generates a device certificate B.OC.bulb back to the second configuration device.

At S1-29, the second configuration device configures the device certificate B.OC.bulb and the access control privilege ACL.Bulb.B.APP to the smart terminal.

At S1-30, for any configuration operation of the second configuration device, the smart terminal checks whether ACL.Bulb.PASE has a corresponding privilege to determine whether to perform or refuse the configuration operation.

At S1-31, the smart terminal discards the OT (SetupCode verifier, SetupCode ID) and ACL.Bulb.PASE after completing the configuration operations.

Figure 5:
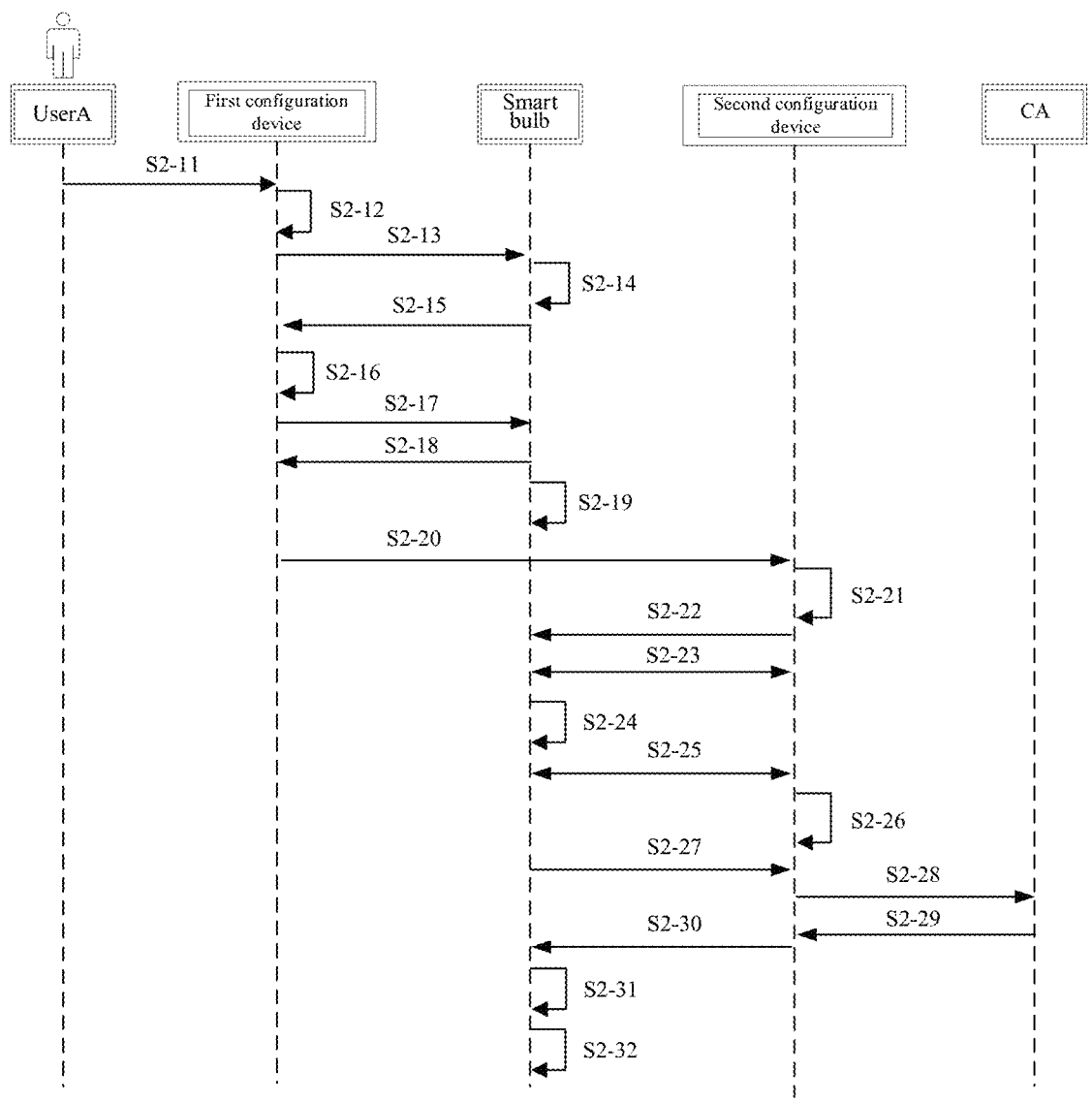
FIG. 5 is another schematic interactive flow chart of privilege sharing according to some embodiments of the present disclosure.

In Embodiment 2, the first configuration device generates a target ACL based on the access privilege information and a configuration code ID, and the SetupCode ID is generated by the smart terminal and indicated to the first configuration device. Specifically, the first configuration device is a configuration device in Fabric A (e.g., A-APP in Fabric A) that has administrator privileges for the smart terminal, and the second configuration device is a configuration device in Fabric B (e.g., B-APP in Fabric B), assuming that the smart terminal is a smart bulb. As shown in FIG. 5, the first configuration device may add the second configuration device as an administrator of the smart terminal through at least some of the operations at S2-11 to S2-32 as follows.

At S2-11, user A triggers to initiate the configuration mode of the smart terminal.

At S2-12, the first configuration device generates an onboarding token OT.

At S2-13, the first configuration device sends a command for preparing to initiate the configuration to the smart terminal, the command carries the SetupCode/SetupCode verifier.

At S2-14, the smart terminal receives the command and generates an ID for the SetupCode corresponding to the SetupCode verifier, or generates an ID for the SetupCode, i.e., generates the SetupCode ID.

At S2-15, the smart terminal returns the generated SetupCode ID to the first configuration device through a response.

At S2-16, the first configuration device generates ACL.Bulb.PASE (i.e., the target ACL) based on default privileges (i.e., access privilege information) configured by user A and the SetupCode ID.

For example, the ACL.Bulb.PASE includes:

```
{
    Privilege = Administrator, // Privilege is administrator
    AuthMode = PASE, // Connection mode is PIN-based configuration
    Subjects = <SetupCode ID>, //Subjects are devices connected with a
    specific SetupCode
    Targets = Cluster[1] //Target resources to access
}
```

At S2-17, the first configuration device sends a command for initiating configuration (i.e., configuration information) to the smart terminal, which carries a timeout period, the SetupCode/SetupCode verifier, and ACL.Bulb.PASE. Alternatively, the command also carries the SetupCode ID.

At S2-18, the smart terminal receives the command and returns a response.

At S2-19, the smart terminal enters into a configuration discovery mode.

At S2-20, the first configuration device shares the OT to the second configuration device in out-of-band manners such as an email and a voice.

At S2-21, the second configuration device turns on the discovery mode.

At S2-22, the second configuration device discovers the smart terminal.

At S2-23, the second configuration device and the smart terminal establish a secure connection through the OT.

At S2-24, the smart terminal finds the corresponding SetupCode ID according to the SetupCode for establishing the secure connection, and finds the ACL.Bulb.PASE according to the SetupCode ID, and further, determines the privileges that the second configuration device has according to the ACL.Bulb.PASE.

At S2-25, the second configuration device authenticates the CD of the smart terminal.

At S2-26, the second configuration device creates a Fabric ID for the home network if the Fabric B has not been used in the home network.

At S2-27, the smart terminal sends a device certificate request CSR.bulb to the second configuration device.

At S2-28, the second configuration device sends the CSR.bulb and the Fabric ID to CA of the Fabric B to request a device certificate.

At S2-29, the CA of the Fabric B authenticates and then generates a device certificate B.OC.bulb back to the second configuration device.

At S2-30, the second configuration device configures the device certificate B.OC.bulb and the access control privilege ACL.Bulb.B.APP to the smart terminal.

At S2-31, for any configuration operation of the second configuration device, the smart terminal checks whether ACL.Bulb.PASE has a corresponding privilege to determine whether to perform or refuse the configuration operations.

At S2-32, The smart terminal discards the OT (SetupCode verifier, SetupCode ID) and ACL.Bulb.PASE after completing the configuration operations.

Figure 6:
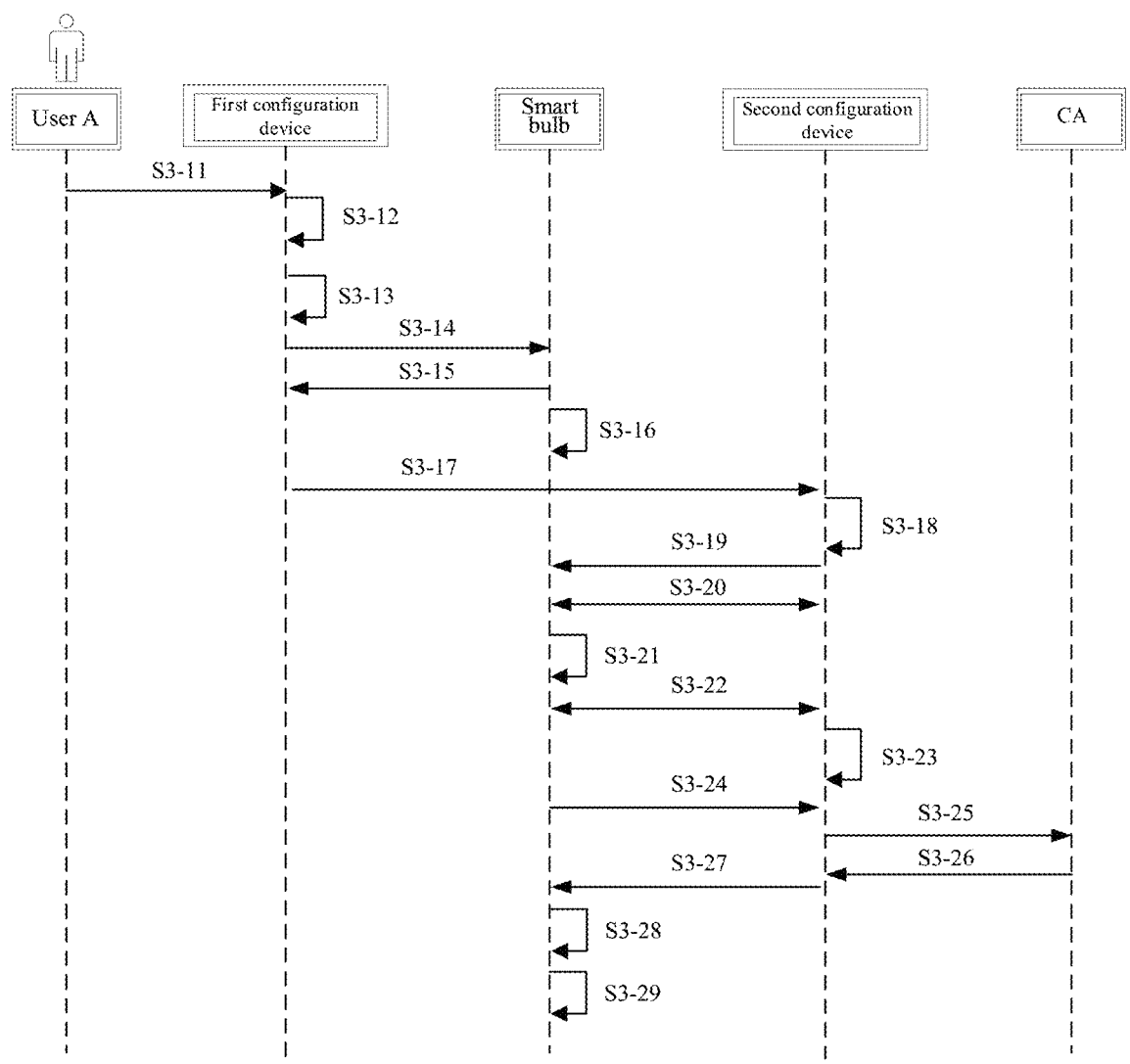
FIG. 6 is yet another schematic interactive flow chart of privilege sharing according to some embodiments of the present disclosure.

In Embodiment 3, the first configuration device generates the target ACL based on the access privilege information and the discriminator. Specifically, the first configuration device is a configuration device in Fabric A (e.g., A-APP in Fabric A) that has administrator privileges for the smart terminal, and the second configuration device is a configuration device in Fabric B (e.g., B-APP in Fabric B), assuming that the smart terminal is a smart bulb. As shown in FIG. 6, the first configuration device may add the second configuration device as an administrator of the smart terminal through at least some of the operations at S3-11 to S3-29.

At S3-11, user A triggers to initiate the configuration mode of the smart terminal.

At S3-12, the first configuration device generates an onboarding token (OT).

At S3-13, the first configuration device generates ACL.Bulb.PASE (i.e., a target ACL) based on default privileges (i.e., access privilege information) configured by user A and the discriminator.

For example, the ACL.Bulb.PASE includes:

{
Privilege = Administrator, // Privilege is administrator
AuthMode = PASE, // Connection mode is PIN-based configuration
Subjects = < Discriminator >, //Subjects are devices paired with a specific Discriminator
Targets = Cluster[1] //Target resources to access
}

At S3-14, the first configuration device sends a command for initiating configuration (i.e., configuration information) to the smart terminal, which carries a timeout period, the SetupCode/SetupCode verifier, the discriminator, and ACL.Bulb.PASE.

At S3-15, the smart terminal receives the command and returns a response.

At S3-16, the smart terminal enters into a configuration discovery mode.

At S3-17, the first configuration device shares the OT to the second configuration device in out-of-band manners such as an email and a voice.

At S3-18, the second configuration device turns on the discovery mode.

At S3-19, the second configuration device discovers the smart terminal.

At S3-20, the second configuration device and the smart terminal establish a secure connection through the OT.

At S3-21, the smart terminal finds the corresponding ACL.Bulb.PASE according to the discriminator for establishing the secure connection, and further, determines the privileges that the second configuration device has according to ACL.Bulb.PASE.

At S3-22, the second configuration device authenticates the CD of the smart terminal.

At S3-23 The second configuration device creates a Fabric ID for the home network if the Fabric B has not been used in the home network.

At S3-24, the smart terminal sends a device certificate request CSR.bulb to the second configuration device.

At S3-25, the second configuration device sends the CSR.bulb and the Fabric ID to CA of the Fabric B to request a device certificate.

At S3-26, the CA of the Fabric B authenticates and then generates a device certificate B.OC.bulb back to the second configuration device.

At S3-27, the second configuration device configures the device certificate B.OC.bulb and the access control privilege ACL.Bulb.B.APP to the smart terminal.

At S3-28, for any configuration operation of the second configuration device, the smart terminal checks whether ACL.Bulb.PASE has a corresponding privilege to determine whether to perform or refuse the configuration operation.

At S3-29, The smart terminal discards the OT (SetupCode verifier, Discriminator) and ACL.Bulb.PASE after completing the configuration operations.

The methods in the embodiments of the present disclosure are described in detail above in conjunction with FIGS. 3 to 6, and the devices in the embodiments of the present disclosure are described in detail below in conjunction with FIGS. 7 to 8. It is to be understood that the devices in the embodiments and the methods in the embodiments correspond to each other, and similar descriptions may be made with reference to the methods in the embodiments.

Figure 7:
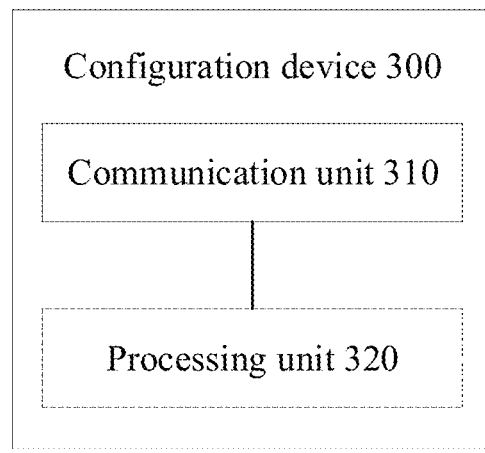
FIG. 7 is a block diagram of a configuration device according to some embodiments of the present disclosure.

FIG. 7 is a block diagram of a configuration device 300 according to some embodiments of the present disclosure. As shown in FIG. 7, the configuration device 300 is a first configuration device, and the configuration device 300 includes a communication unit 310, configured to send configuration information to a smart terminal, wherein the configuration information includes at least a target access control list (ACL); the target ACL is configured to indicate an access privilege that a second configuration device has for the smart terminal.

In some embodiments, the configuration device 300 further includes a processing unit 320, configured to generate the target ACL based on information for establishing a connection by the second configuration device.

In some embodiments, the information for establishing connection by the second configuration device includes SetupCode ID. The processing unit 320 is specifically configured to generate the target ACL based on access privilege information and the SetupCode ID.

In some embodiments, the SetupCode ID uniquely identifies a PIN code for establishing a connection with the second configuration device.

In some embodiments, this target ACL includes at least one of: the SetupCode ID, access object information, privilege information corresponding to an access object, and a connection mode based on key authentication.

In some embodiments, the configuration information further includes the SetupCode ID.

In some embodiments, the processing unit 320 is further configured to generate an onboarding token; the onboarding token includes the SetupCode ID.

In some embodiments, the communication unit 310 is further configured to send pre-configuration information to the smart terminal; the pre-configuration information includes a SetupCode or a SetupCode verifier; the communication unit 310 is further configured to receive a pre-configuration response sent from the smart terminal; the pre-configuration response includes the SetupCode ID, and the SetupCode ID corresponds to the SetupCode or the SetupCode verifier.

In some embodiments, the information for establishing a connection by the second configuration device includes a discriminator. The processing unit 320 is specifically configured to generate the target ACL based on access privilege information and the discriminator, wherein the discriminator is a vendor ID for establishing a connection by the second configuration device.

In some embodiments, this target ACL includes at least one of: the discriminator, access object information, privilege information corresponding to an access object, and a connection mode based on key authentication.

In some embodiments, the configuration information further includes the discriminator.

In some embodiments, the access privilege information is defaulted, or the access privilege information is pre-configured or agreed in a protocol.

In some embodiments, the communication unit 310 is further configured to receive a user instruction; the user instruction is configured to indicate the access privilege information.

In some embodiments, before receiving the user instructions, the communication unit 310 is further configured to send request information; the request information is configured to request a user to set the access privilege.

In some embodiments, the above communication unit may be a communication interface or transceiver, or an input/output interface of a communication chip or a system-on-chip. The processing unit described above may be one or more processors.

It should be understood that the configuration device 300 according to embodiments of the present disclosure may correspond to the first configuration device in the method embodiments of the present disclosure, and that the above and other operations and/or functions of the various units in the configuration device 300 realize the corresponding processes of the first configuration device in the method illustrated in FIGS. 3 to 6 respectively. The processes are not described herein for brevity.

Figure 8:
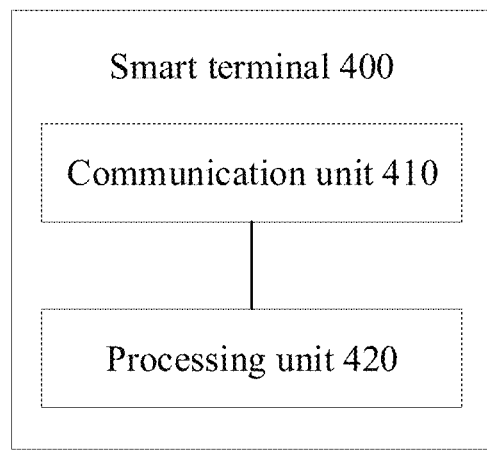
FIG. 8 is a block diagram of a smart terminal according to some embodiments of the present disclosure.

FIG. 8 is a block diagram of a smart terminal 400 according to some embodiments of the present disclosure. As shown in FIG. 8, the smart terminal 400 includes a communication unit 410, configured to receive configuration information sent from a first configuration device, wherein the configuration information includes at least a target access control list (ACL); the target ACL is configured to indicate access privileges that a second configuration device has for the smart terminal; and the processing unit 420, configured to determine the access privilege that the second configuration device has for the smart terminal based on the target ACL.

In some embodiments, the processing unit 420 is configured to determine a privilege for a configuration operation that the second configuration device has based on the target ACL; the processing unit 420 is configured to refuse the configuration operation, in response to the target ACL indicating that the second configuration device has no privileges for the configuration operation; and/or the processing unit 420 is configured to perform the configuration operation, in response to the target ACL indicating that the second configuration device has the privilege for the configuration operation.

In some embodiments, the target ACL is generated based on information for establishing a connection by the second configuration device.

In some embodiments, the information for establishing connection by the second configuration device includes a SetupCode ID; the target ACL is generated based on access privilege information and the SetupCode ID.

In some embodiments, the SetupCode ID uniquely identifies a PIN code for establishing a connection with the second configuration device.

In some embodiments, the target ACL includes at least one of: the SetupCode ID, access object information, privilege information corresponding to an access object, and a connection mode based on key authentication.

In some embodiments, the configuration information further includes the SetupCode ID.

In some embodiments, the SetupCode ID is generated from the first configuration device.

In some embodiments, the communication unit 410 is further configured to receive pre-configuration information sent from the first configuration device, wherein the pre-configuration information includes a SetupCode or a SetupCode verifier. The communication unit 410 is further configured to send a pre-configuration response to the first configuration device, wherein the pre-configuration response includes the SetupCode ID, and the SetupCode ID corresponds to the SetupCode or the SetupCode verifier.

In some embodiments, the processing unit 420 is further configured to determine the corresponding SetupCode ID, based on a SetupCode applied in a secure connection established by the second configuration device, and determine the corresponding target ACL based on the SetupCode ID.

In some embodiments, the processing unit 420 is further configured to discard or delete the target ACL and/or the SetupCode ID.

In some embodiments, the information for establishing a connection by the second configuration device includes a discriminator; the target ACL is generated based on access privilege information and the discriminator.

In some embodiments, the discriminator is a vendor ID for establishing a connection by the second configuration device.

In some embodiments, the target ACL includes at least one of the discriminator, access object information, privilege information corresponding to an access object, and a connection mode based on key authentication.

In some embodiments, the configuration information further includes the discriminator.

In some embodiments, this processing unit 420 is further configured to determine the corresponding target ACL based on the discriminator applied in a secure connection established by the second configuration device.

In some embodiments, this processing unit 420 is further configured to discard or delete the target ACL and/or the discriminator.

In some embodiments, the access privilege information is defaulted, or the access privilege information is pre-configured or agreed in a protocol.

In some embodiments, the access privilege information is indicated by a user instruction.

In some embodiments, the above-described communication unit may be a communication interface or transceiver, or an input/output interface of a communication chip or system-on-chip. The processing unit described above may be one or more processors.

It should be understood that the smart terminal 400 according to the embodiments of the present disclosure may correspond to the smart terminal in the method embodiments of the present disclosure, and that the above and other operations and/or functions of the various units in the smart terminal 400 realize the corresponding processes of the smart terminal in the method illustrated in FIGS. 3 to 6 respectively. The processes are not described herein for brevity.

Figure 9:
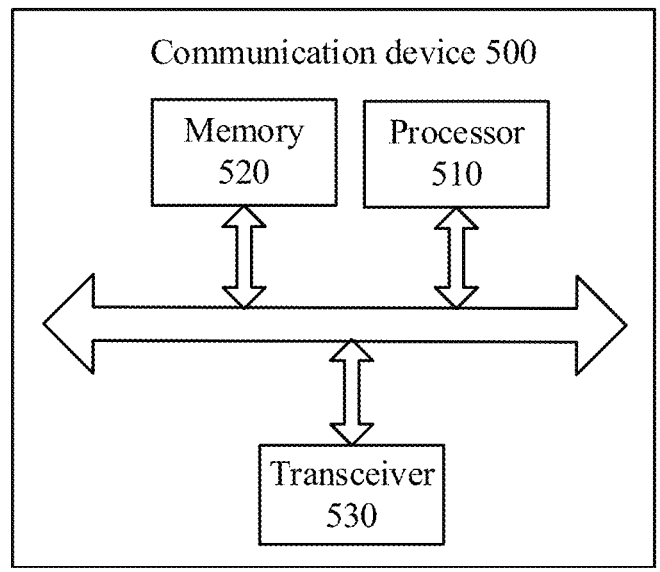
FIG. 9 is a block diagram of a communication device according to some embodiments of the present disclosure.

FIG. 9 is a block diagram of a communication device according to some embodiments of the present disclosure. The communication device 500 shown in FIG. 9 includes a processor 510, and the processor 510 may invoke and perform the computer program in a memory, and execute the method in the embodiments of the present disclosure.

In some embodiments, as shown in FIG. 9, the communication device 500 may also include a memory 520. The processor 510 may invoke and perform the computer program in the memory 520 to execute the method in the embodiments of the present disclosure.

The memory 520 may be a separate component from the processor 510 or may be integrated into the processor 510.

In some embodiments, as shown in FIG. 9, the communication device 500 may also include a transceiver 530, wherein the processor 510 may control the transceiver 500 to communicate with other devices, specifically, to send information or data to other devices or to receive information or data sent from other devices.

The transceiver 530 may include a transmitter and a receiver. The transceiver 530 may further include antenna (s), and the number of antennas may be one or more.

In some embodiments, the communication device 500 may specifically be a configuration device of an embodiment of the present disclosure, and the communication device 500 may realize the corresponding processes realized by the first configuration device in the various methods in the embodiments of the present disclosure, which will not be repeated herein for brevity.

In some embodiments, the communication device 500 may specifically be a smart terminal of the embodiments of the present disclosure, and the communication device 500 may realize the corresponding processes realized by the smart terminal in the various methods in the embodiments of the present disclosure, which will not be repeated herein for brevity.

Figure 10:
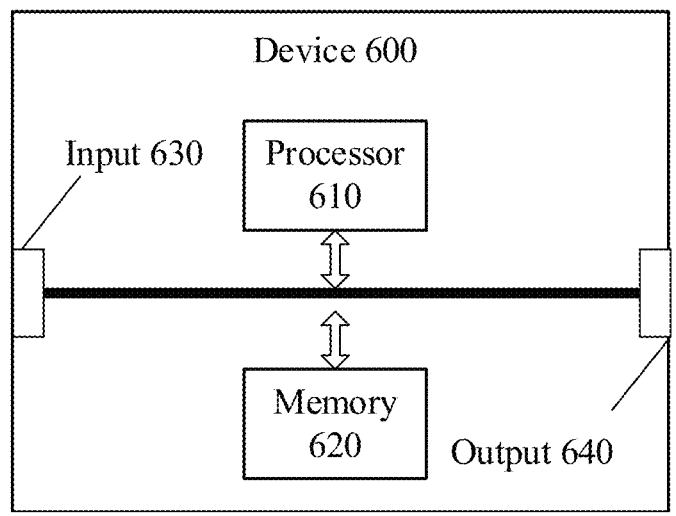
FIG. 10 is a block diagram of a device according to some embodiments of the present disclosure.

FIG. 10 is a block diagram of a device according to some embodiments of the present disclosure. The device 600 shown in FIG. 10 includes a processor 610, wherein the processor 610 may invoke and perform a computer program in the memory to execute a method in an embodiment of the present disclosure.

In some embodiments, as shown in FIG. 10, the device 600 may also include a memory 620. wherein the processor 610 may allocate and perform a computer program in the memory 620 to execute a method in an embodiment of the present disclosure.

The memory 620 may be a separate component from the processor 610 or may be integrated into the processor 610.

In some embodiments, the device 600 may also include an input interface 630. The processor 610 may control the input interface 630 to communicate with other devices or chips, specifically, to obtain information or data sent from other devices or chips.

In some embodiments, the device 600 may further include an output interface 640. The processor 610 may control the output interface 640 to communicate with the other device or chip, specifically, to send information or data to the other devices or chips.

In some embodiments, the device 600 may be applied to a configuration device in the embodiments of the present disclosure, and the device 600 may realize the corresponding processes realized by the first configuration device in the various methods in the embodiments of the present disclosure, which will not be repeated herein for brevity.

In some embodiments, the device 600 may be applied to a smart terminal in the embodiments of the present disclosure, and the device 600 may realize the corresponding processes realized by the smart terminal in the various methods of the embodiments of the present disclosure, which will not be repeated herein for brevity.

In some embodiments, the device referred to in the embodiments of the present disclosure may also be a chip. For example, it may be a systematic chip, a system chip, or a system-on-chip, etc.

Figure 11:
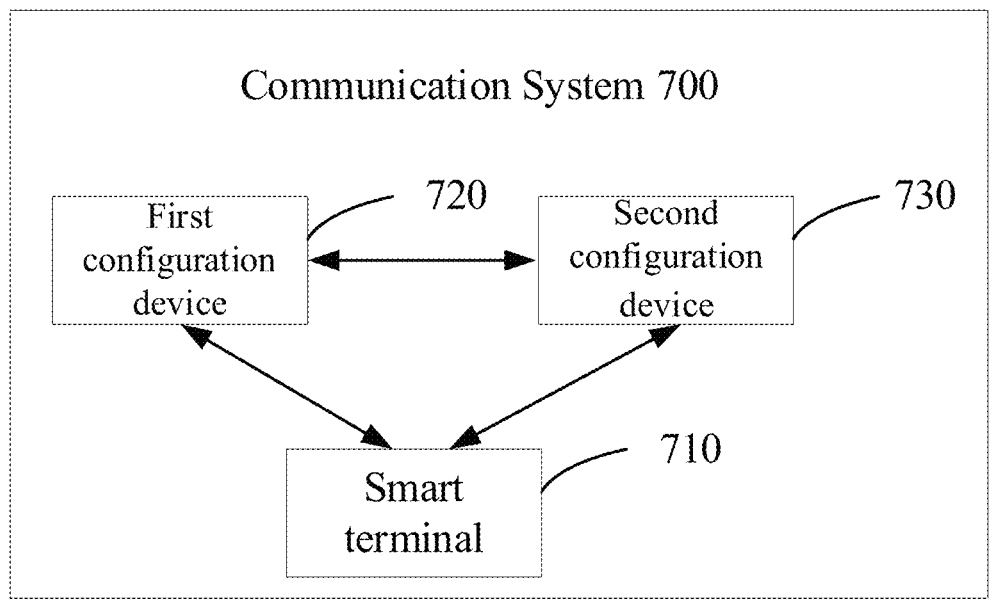
FIG. 11 is a block diagram of a communication system according to some embodiments of the present disclosure.

FIG. 11 is a block diagram of a communication system 700 according to some embodiments of the present disclosure. As shown in FIG. 11, the communication system 700 at least includes a smart terminal 710, a first configuration device 720, and a second configuration device 730.

The smart terminal 710 may be used to realize corresponding functions realized by the smart terminal in the above-described method, and the first configuration device 720 may be used to realize corresponding functions realized by the first configuration device in the above-described method, which will not be repeated herein for the brevity.

It should be understood that the processor in the embodiments of the present disclosure may be an integrated circuit chip with signal processing capability. In the process of realization, the steps of the above method embodiments may be accomplished by integrated logic circuits of hardware in the processor or by instructions in the form of software. The above-described processor may be a general-purpose processor, a Digital Signal Processor (DSP), an Application Specific Integrated Circuit (ASIC), a Field Programmable Gate Array (FPGA), or other programmable logic device, discrete gate or transistor logic device, and discrete hardware components. Various methods, steps, and logic block diagrams of the disclosure in embodiments of the present disclosure may be implemented or performed by the processors mentioned above. The general-purpose processor may be a microprocessor or the processor may also be any conventional processor, etc. The steps in conjunction with the methods disclosed in embodiments of the present disclosure may be directly completed by performing in a hardware decoding processor, or be completed by performing with a combination of hardware and software modules in the decoding processor. The software module may be located in a random memory, flash memory, read-only memory, programmable read-only memory, or electrically erasable programmable memory, registers, and other storage media usually used in the art. The storage medium is located in a memory, and the processor reads the information in the memory and completes the steps of the method described above in conjunction with its hardware.

It will be understood that the memory in embodiments of the present disclosure may be a volatile memory or a non-volatile memory, or may include both volatile and non-volatile memories. The non-volatile memory may be Read-Only Memory (ROM), Programmable Read-Only Memory (PROM), Erasable Programmable Read-Only Memory (EPROM), Electrically Erasable Programmable Read-Only Memory (EEPROM), or flash memory. The volatile memory may be Random Access Memory (RAM), which is used as an external cache. By way of illustration, but not limitation, many forms of RAM are available, such as Static RAM (SRAM), Dynamic RAM (DRAM), Synchronous DRAM (SDRAM), Double Data Rate SDRAM (DDR SDRAM), Enhanced Synchronous DRAM (ESDRAM), Synchlink DRAM (SLDRAM), and Direct Rambus RAM (DR.RAM). It should be noted that the memory of the systems and methods described herein is intended to include, but is not limited to, these and any other suitable types of memory.

It should be understood that the above memories are exemplary but not limiting descriptions, for example, the memories in embodiments of the present disclosure may also be static RAM (SRAM), dynamic RAM (DRAM), Synchronous DRAM (SDRAM), Double Data Rate SDRAM (DDR SDRAM), Enhanced Synchronous DRAM (ESDRAM), Synchlink DRAM (SLDRAM), and Direct Rambus RAM (DR.RAM), etc. That is, the memory in embodiments of the present disclosure is intended to include, but is not limited to, these and any other suitable types of memory.

Embodiments of the present disclosure also provide a computer readable storage medium for storing a computer program.

In some embodiments, the computer-readable storage medium may be applied to a configuration device in the embodiments of the present disclosure, and the computer program makes the computer execute the corresponding processes realized by the first configuration device in the various methods in the embodiments of the present disclosure, which are not described herein for brevity.

In some embodiments, the computer-readable storage medium may be applied to a smart terminal in the embodiments of the present disclosure, and the computer program makes the computer execute the corresponding processes realized by the smart terminal in the various methods of the embodiments of the present disclosure, which are not repeated herein for brevity.

Embodiments of the present disclosure also provide a computer program product including computer program instructions.

In some embodiments, the computer program product may be applied to a configuration device in the embodiments of the present disclosure, and the computer program instructions make the computer execute the corresponding processes realized by the first configuration device in the various methods in the embodiments of the present disclosure, which are not repeated herein for brevity.

In some embodiments, the computer program product may be applied to the smart terminal in the embodiments of the present disclosure, and the computer program instructions make the computer execute the corresponding processes realized by the smart terminal in the various methods in the embodiments of the present disclosure, which are not repeated herein for brevity.

Embodiments of the present disclosure also provide a computer program.

In some embodiments, the computer program may be applied to a configuration device in the embodiments of the present disclosure, and when the computer program is performed on the computer, the computer is made to execute the corresponding processes realized by the first configuration device in the various methods in the embodiments of the present disclosure, which are not described herein for brevity.

In some embodiments, the computer program may be applied to a smart terminal in the embodiments of the present disclosure, and when the computer program is performed on the computer, the computer is made to execute the corresponding processes realized by the smart terminal in the various methods in the embodiments of the present disclosure, which are not repeated herein for brevity.

The skilled in the art may realize that the units and algorithmic steps described in conjunction with the various examples of the embodiments disclosed herein are capable of being realized in electronic hardware, or a combination of computer software and electronic hardware. Whether these functions are performed in hardware or software depends on the particular disclosure and design constraints of the technical solution. The skilled in the art may use different methods to realize the described functions for each particular disclosure, but such implementations should not be considered outside the scope of this disclosure.

It is clear to the skilled in the field, for the convenience and brevity of the description, the specific working processes of the above-described systems, apparatuses, and units can be referred to the corresponding processes in the foregoing methods of the embodiments, which will not be repeated herein.

In the several embodiments provided in the present disclosure, it should be understood that the systems, apparatuses, and methods disclosed, may be realized in other ways. For example, the above-described embodiments of the device are merely schematic, e.g., the division of the described units, which is merely a logical functional division, may be divided in other ways when actually implemented, e.g., multiple units or components may be combined or may be integrated into another system, or some features may be ignored, or not implemented. At another point, the coupling or direct coupling or communication connection between each other shown or discussed may be an indirect coupling or communication connection through some interface, device, or unit, which may be electrical, mechanical, or otherwise.

The units illustrated as separated components may or may not be physically separated, and components shown as units may or may not be physical units, i.e., they may be located in a single place or may also be distributed over a plurality of network units. Some or all of these units may be selected to fulfill the purpose of the embodiment scheme according to actual needs.

In addition, the functional units in various embodiments of the present disclosure may be integrated in a single processing unit, or each unit may be physically present separately, or two or more units may be integrated into a single unit.

The functions may be stored in a computer-readable storage medium if the functions are implemented as a software functional unit and sold or used as a separate product. With this understanding, the technical solution, or a part that contributes to the prior art, or a part of the technical solution of the present disclosure may be embodied in the form of a software product. The software product is stored in a storage medium and includes several instructions to make a computer device (which may be a personal computer, a server, or a network device, etc.) to carry out all or part of the steps of the method described in the various embodiments of the present disclosure. The computer software product is stored in a storage medium including several instructions to make a computer device (which may be a personal computer, a server, or a network device, etc.) to perform all or part of the steps of the method described in various embodiments of the present disclosure. The aforementioned storage medium includes a USB flash drive, a removable hard disk, a read-only memory (ROM), a random access memory (RAM), a diskette or a CD-ROM, and other media that may store program code.

The foregoing is only some embodiments of the present disclosure, and is not intended to limit the present disclosure, which is subject to various changes and variations for the skilled in the art. Any modification, equivalent replacement, improvement, etc. made within the principles of this disclosure shall be included in the scope of protection of the present disclosure.

What is claimed is:

1. A wireless communication method, comprising:
   sending, by a first configuration device, configuration information to a smart terminal, wherein the configuration information at least comprises a target access control list (ACL); and the target ACL is configured to indicate an access privilege that a second configuration device has for the smart terminal; wherein
   the method further comprises:
   generating, by the first configuration device, the target ACL,
   based on information for establishing a connection by the second configuration device, wherein
   the information for establishing connection by the second configuration device comprises a SetupCode identifier (ID); and
   the generating, by the first configuration device, the target ACL,
   based on the information for establishing the connection by the second configuration device, comprises:
   generating, by the first configuration device, the target ACL,
   based on access privilege information and the SetupCode ID; wherein
   the method further comprises:
   sending, by the first configuration device, pre-configuration information to the smart terminal,
   wherein the pre-configuration information comprises a SetupCode or a SetupCode verifier; and
   receiving, by the first configuration device,
   a pre-configuration response sent from the smart terminal,
   wherein the pre-configuration response comprises the SetupCode ID, and
   the SetupCode ID corresponds to the SetupCode or the SetupCode verifier.

2. The method as claimed in claim 1, wherein the SetupCode ID uniquely identifies a PIN code for establishing a connection with the second configuration device.

3. The method as claimed in claim 1, wherein the target ACL comprises at least one of:
   the SetupCode ID, access object information, privilege information corresponding to an access object, and a connection mode based on key authentication.

4. The method as claimed in claim 1, wherein the configuration information further comprises the SetupCode ID.

5. The method as claimed in claim 1, further comprising:
   generating, by the first configuration device, an onboarding token, wherein the onboarding token comprises the SetupCode ID.

6. The method as claimed in claim 1, wherein the access privilege information is defaulted, or the access privilege information is pre-configured or agreed in a protocol.

7. The method as claimed in claim 1, further comprising:
   receiving, by the first configuration device, a user instruction, wherein the user instruction is configured to indicate the access privilege information.

8. The method as claimed in claim 7, before receiving the user instruction, further comprising:
   sending, by the first configuration device, request information to a user, wherein the request information is configured to request the user to set the access privilege that the second configuration device has for the smart terminal.

9. A wireless communication method, comprising:
   receiving, by a smart terminal, configuration information sent from a first configuration device,
   wherein the configuration information at least comprises a target access control list (ACL); and
   the target ACL is configured to indicate an access privilege that a second configuration device has for the smart terminal;
   determining, by the smart terminal, the access privileges that the second configuration device has for the smart terminal based on the target ACL, wherein
   the target ACL is generated based on information for establishing a connection by the second configuration device;
   the information for establishing the connection by the second configuration device comprises SetupCode identifier (ID); and
   the target ACL is generated based on access privilege information and the SetupCode ID; wherein
   the method further comprises:
   receiving, by the smart terminal,
   pre-configuration information sent from the first configuration device,
   wherein the pre-configuration information comprises a SetupCode or a SetupCode verifier; and
   sending by the smart terminal,
   a pre-configuration response to the first configuration device, wherein the pre-configuration response comprises the SetupCode ID, and the SetupCode ID corresponds to the SetupCode or the SetupCode verifier.

10. The method as claimed in claim 9, further comprising:

determining, by the smart terminal, whether the second configuration device has a privilege for a configuration operation based on the target ACL;

refusing, by the smart terminal, the configuration operation, in response to the target ACL indicating that the second configuration device has no privileges for the configuration operation; and/or performing, by the smart terminal, the configuration operation, in response to the target ACL indicating that the second configuration device has the privilege for the configuration operation.

11. The method as claimed in claim 9, further comprising:

determining, by the smart terminal, a corresponding SetupCode ID based on a SetupCode applied in a secure connection established with the second configuration device, and determining, by the smart terminal, a corresponding target ACL based on the SetupCode ID.

12. The method as claimed in claim 9, further comprising:

discarding or deleting, by the smart terminal, the target ACL and/or a SetupCode ID.

13. The method as claimed in claim 9, further comprising:

discarding or deleting, by the smart terminal, the target ACL and/or a discriminator.

14. A configuration device, wherein the configuration device is a first configuration device, and the first configuration device comprises a processor and a memory, wherein the memory is configured to store a computer program; the processor is configured to invoke and perform the computer program in the memory to cause the first configuration device to execute:

sending, by a first configuration device, configuration information to a smart terminal, wherein the configuration information at least comprises a target access control list (ACL); and the target ACL is configured to indicate an access privilege that a second configuration device has for the smart terminal; wherein the processor is configured to invoke and perform the computer program in the memory to cause the first configuration device to further execute:

generating the target ACL, based on information for establishing a connection by the second configuration device, wherein the information for establishing connection by the second configuration device comprises a SetupCode identifier (ID); and the processor is configured to invoke and perform the computer program in the memory to cause the first configuration device to execute:

generating the target ACL, based on access privilege information and the SetupCode ID; wherein the processor is configured to invoke and perform the computer program in the memory to cause the first configuration device to further execute:

sending pre-configuration information to the smart terminal, wherein the pre-configuration information comprises a SetupCode or a SetupCode verifier; and receiving a pre-configuration response sent from the smart terminal, wherein the pre-configuration response comprises the SetupCode ID, and the SetupCode ID corresponds to the SetupCode or the SetupCode verifier.

15. The configuration device as claimed in claim 14, wherein the SetupCode ID uniquely identifies a PIN code for establishing a connection with the second configuration device.

16. The configuration device as claimed in claim 14, wherein the target ACL comprises at least one of:

the SetupCode ID, access object information, privilege information corresponding to an access object, and a connection mode based on key authentication.

17. The configuration device as claimed in claim 14, wherein the configuration information further comprises the SetupCode ID.

18. The configuration device as claimed in claim 14, wherein the processor is configured to invoke and perform the computer program in the memory to cause the first configuration device to further execute:

generating an onboarding token, wherein the onboarding token comprises the SetupCode ID.

19. The configuration device as claimed in claim 14, wherein the access privilege information is defaulted, or the access privilege information is pre-configured or agreed in a protocol.

20. The configuration device as claimed in claim 14, wherein the processor is configured to invoke and perform the computer program in the memory to cause the first configuration device to further execute:

receiving a user instruction, wherein the user instruction is configured to indicate the access privilege information.

* * * * *